United States Patent [19]

Izawa et al.

[11] 3,929,931
[45] Dec. 30, 1975

[54] GRAFT COPOLYMER OF STYRENE TYPE COMPOUND AND A POLYPHENYLENE ETHER

[75] Inventors: Shinichi Izawa, Tokyo; Katsuhiko Tsuzimura, Kanagawa; Ken Mizushiro, Tokyo; Juro Ozeki, Kanagawa; Yoshiaki Sugawara, Kanagawa; Tsutomu Tanaka, Kanagawa; Astuo Nakanishi, Kanagawa, all of Japan

[73] Assignee: Asahi-Dow Limited, Japan

[22] Filed: Aug. 28, 1974

[21] Appl. No.: 501,451

[30] Foreign Application Priority Data
Sept. 6, 1973  Japan.............................. 48-99713

[52] U.S. Cl.......... 260/874; 260/876 R; 260/876 B; 260/892; 260/898; 260/899; 260/901; 260/33.6 UA
[51] Int. Cl.².................... C08L 23/00; C08L 25/00
[58] Field of Search........................... 260/874, 892

[56] References Cited
UNITED STATES PATENTS

| 3,522,326 | 7/1970 | Bostick et al. | 260/823 |
| 3,700,630 | 10/1972 | Hamada et al. | 260/17.2 S |

*Primary Examiner*—Richard B. Turer
*Attorney, Agent, or Firm*—Cushman, Darby & Cushman

[57] ABSTRACT

A novel graft copolymer composition comprising 30 to 90 wt. % of a graft copolymer containing substantially no polyphenylene ether homopolymer and 10 to 70 wt. % of a styrene type compound polymer having a number average molecular weight in the range from 50,000 to 200,000. The graft copolymer is prepared by graft polymerizing 20 to 200 parts by weight of a styrene type compound on an oligophenylene ether with a polymerization degree of 60 to 90. The composition has excellent resistance to creep.

15 Claims, No Drawings

GRAFT COPOLYMER OF STYRENE TYPE COMPOUND AND A POLYPHENYLENE ETHER

This invention relates to a novel graft copolymer composition comprising a graft copolymer prepared by grafting a styrene type compound on an oligophenylene ether, and a styrene type compound polymer and/or a rubbery substance. More particularly, the invention is concerned with a thermoplastic resin composition containing or not containing a rubbery substance which comprises a styrene type compound polymer and a graft copolymer obtained by grafting a styrene type compound on an oligophenylene ether according to a graft copolymerization process newly established by the present inventors which process can give a graft copolymer substantially free from oligophenylene ether homopolymer.

Polyphenylene ethers are resins which have excellent mechanical properties, electrical characteristics, chemical resistance and heat resistance, low water absorptivity and high dimensional stability, and hence have recently been watched with keen interest. However, the polyphenylene ethers are too high in second transition point to be softened with ease, so that they have the drawback of being relatively low in moldability. Heretofore, many processes for overcoming this drawback of polyphenylene ethers have been proposed. For example, processes for improving polyphenylene ethers in their melt-flow property by blending with styrene type compound polymers are disclosed in Japanese Patent Publication No. 17,812/68 and U.S. Pat. No. 3,383,435, processes by blending with polyolefins such as polyethylene and polypropylene in U.S. Pat. No. 3,361,851, processes by blending with polycarbonates in U.S. Pat. No. 3,221,080 and processes by blending with nylons in U.S. Pat. No. 3,379,792. A process for producing compositions having excellent melt-flow property by the use of polyphenylene ethers low in number average molecular weight was proposed by the present inventors (Japanese Patent Publication No. 32,774/73). Further, processes for preparing compositions having improved properties by grafting styrene type compounds or vinyl ethers on polyphenylene ethers are disclosed in U.S. Pat. No. 3,586,736 and U.S. Pat. No. 3,700,630.

U.S. Pat. No. 3,660,531 (to Lauchlan et al.) discloses a mechanical blend comprising the three components polyphenylene ether, polystyrene and a butadiene copolymer. The present invention provides a practically useful resinous composition having excellent processability which cannot be achieved by such a mechanical blend. Although improvement of processability is mentioned in the specification of said Lauchlan et al. U.S. patent, it is only a comparison between two different resinous compositions (e.g. 100% polyphenylene ether and a mixture thereof with 20% block SBR). Improvement of processability is achieved in said patent by a conventional method wherein a resin extremely high in the melt-flow property (i.e. polystyrene) is compounded with a resin high in physical properties but with poor melt-flow property (i.e. polyphenylene ether). The improvement in processability achieved by the use of the present graft copolymer is clearly seen by the difference in injection molding conditions between Example 2 and Control Example 1 as hereinafter set forth. Furthermore, Control Example 7 shows the moldability of the resinous composition in accordance with the procedure as disclosed in Lauchlan et al. and physical properties of an injection molded article prepared therefrom.

U.S. Pat. No. 3,749,693 also discloses a resinous composition comprising three components of polyphenylene ether, polystyrene (rubber reinforced) and low molecular weight oligophenylene ether. This patent evidences the fact that resinous compositions comprising polyphenylene ether and polystyrene involve a serious problem in processability in industrial applications. The present invention provides, without recourse to compounding with low molecular weight polymers, a resinous composition greatly enhanced in processability. Further evidence of durable physical properties such as creep deformation, which is considered to be due to the specific graft polymer, is also revealed by the composition of the present invention, as is illustrated in the Examples and Control Examples set forth below.

Under the circumstances pointed out above, the present invention is based on the finding of a technique for preparing a novel graft copolymer composition which is well balanced in resin properties and excellent in moldability. That is, there has been established a process in which a styrene type compound is grafted by bulk polymerization in the presence of a radical polymerization initiator on an oligophenylene ether having a number average polymerization degree in the range from 60 to 90 to obtain a graft copolymer containing substantially no oligophenylene ether homopolymer (Japanese Patent Application No. 99,712/73 and our corresponding U.S. application Ser. No. 501,450 filed on even date with the present case and entitled 'Process for Producing Graft Copolymers'. The entire disclosure of said United States application is hereby incorporated by reference.). It has been found that the thus obtained graft copolymer when mixed with a styrene type compound polymer and/or a rubber substance gives a thermoplastic resin composition displaying unexpected effects.

The composition of the present invention is characterized in that it is composed of a styrene type compound polymer and a styrene type compound-oligophenylene ether graft copolymer containing no oligophenylene ether homopolymer, and that it has no undesirable physical properties derived from the presence of oligophenylene ether homopolymer but has excellent properties, particularly in creep characteristics and fatigue resistance.

The oligophenylene ether referred to in the present invention is a compound represented by the general formula,

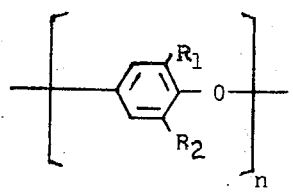

wherein $R_1$ and $R_2$ represent individually an alkyl group having 1 to 4 carbon atoms or a halogen atom, and $n$ represents a polymerization degree in the range from 60 to 90. Concrete examples of the oligophenylene ether include oligo(2,6-dimethylphenylene-1,4-ether), oligo(2-methyl-6-ethylphenylene-1,4-ether), oligo(2,6-diethylphenylene-1,4-ether), oligo(2-methyl-6-n- propylphenylene-1,4-ether), oligo(2-methyl-6-n-butylphenylene-1,4-ether), oligo(2-methyl-6-chlorophenylene-1,4-ether), oligo(2-methyl-6-bromophenylene-1,4-ether) and oligo(2-ethyl-6-chlorophenylene-1,4-ether).

The number average polymerization degree of the oligophenylene ether is in the range from 60 to 90, preferably from 65 to 85. If the number average polymerization degree of the oligophenylene ether is less than 60, such graft copolymer containing no oligophenylene ether homopolymer is prepared with difficulty and the final resin composition does not have desirable physical properties, so that the object of the present invention cannot be accomplished. On the other hand, if the number average polymerization degree of the oligophenylene ether is more than 90, the final resin composition is undesirably deteriorated in flowability and, in extreme cases, is brought to the form of a gel.

The styrene type compound in the styrene type compound-oligophenylene ether graft copolymer used in the present invention is styrene or an alkylated or halogenated styrene derivative. Concrete examples of the styrene type compound include styrene, α-methylstyrene, 2,4-dimethylstyrene, monochlorostyrene, dichlorostyrene, p-methylstyrene, p-tertbutylstyrene and ethylstyrene. The styrene type compound may be used in combination with a copolymerizable vinyl compound such as, for example, methyl methacrylate, acrylonitrile, methacrylonitrile, butyl acrylate or butadiene. Further, two or more styrene type compounds may be used. The amount of the styrene type compound grafted on the oligophenylene ether is 20 to 200 wt%, preferably 30 to 180 wt%, of the oligophenylene ether. If the amount of the grafted styrene type compound is less than 20 wt%, the oligophenylene ether homopolymer unavoidably remains in the graft copolymer, while if the amount thereof is more than 200 wt%, the final resin composition loses the balance of physical properties, which balance is a characteristic of the present invention, and is undesirably deteriorated particularly in impact strength.

The styrene type compound polymer referred to in the present invention is a polymer composed mainly of a styrene type compound having a number average molecular weight in the range from 50,000 to 200,000, preferably from 60,000 to 150,000. The proportion of the styrene type compound polymer in the total composition is in the range from 10 to 70 wt%, preferably from 15 to 60 wt%. If the polymer is composed of a styrene type compound having a number average molecular weight of less than 50,000, the resulting composition is undesirably deteriorated in physical properties, particularly in impact strength and creep characteristics. On the other hand, if the polymer is composed of a styrene type compound having a number average molecular weight of more than 200,000, the resulting composition is undesirably deteriorated in moldability to cause degradation of impact strength due to thermal deterioration and permanent set at the time of molding. If the amount of the styrene type compound polymer is less than 10 wt%, the balance of physical properties of the resulting composition, which balance is an effect derived from the addition of said polymer, is difficult to maintain. Particularly for maintenance of thermal stability at the time of molding, impact strength and creep characteristics of the resulting composition, the amount of the polymer is at least 10 wt%, preferably at least 15 wt%. On the other hand, if the amount of the styrene type compound polymer is more than 70 wt%, the resulting composition is undesirably deteriorated in heat deformation resistance and tensile strength so as to make it impossible to attain the desired balance of physical properties.

The rubbery substance referred to in the present invention is a member of a general class of synthetic rubbers, including conjugated diene rubbers such as polybutadiene, polyisoprene and styrene-butadiene copolymer rubbers, and is preferably one which has been improved in miscibility by graft copolymerization with a styrene type compound. The amount of the rubbery substance is 15 wt% or less, preferably in the range from 2 to 13 wt%. If the amount of the rubbery substance is more than 15 wt%, the resulting composition is undesirably deteriorated in heat deformation resistance, surface gloss and elasticity. Moreover, since improvement in impact strength has sufficiently been accomplished by addition of the indicated amount of rubbery substance, the use of more than 15 wt% of the rubbery substance is not desirable. On the other hand, since there are some cases where the desired balance of physical properties can be attained without the use of rubbery substance, the addition of the rubbery substance is not an essential condition of the present invention.

The styrene type compound-oligophenylene ether graft copolymer used in the present invention is prepared by the process of applicants' aforementioned application filed on even date. According to said process, 20 to 200 parts by weight, preferably 25 to 170 parts by weight, of a styrene type compound is graft polymerized in the presence of 100 parts by weight of polyphenylene ether and 0.1 to 15 parts by weight, preferably 0.3 to 12 parts by weight, of a radical initiator at a temperature in the range of 130° to 200°C under anhydrous conditions. The fact that said graft copolymer contains no oligophenylene ether homopolymer can be confirmed by analyzing the copolymer according to the method reported by A. Factor et al. in Journal of Polymer Science, 7B 205 (1969). That is, the composition of the present invention is treated with toluene to remove a toluene-insoluble portion (component consisting of gelled rubbery substance), and then dried to obtain a toluene-soluble portion. Ordinarily, this portion is uniformly soluble in methylene chloride without forming any precipitate. A. Factor et al. say that according to the method reported by them, a polyphenylene ether can be completely separated from a mixture thereof with a polystyrene because when charged into methylene chloride, the mixture is dissolved in the methylene chloride but the polyphenylene ether ordinarily forms a complex with the methylene chloride and thus is insolubilized and precipitated. Even if a methylene chloride solution of the toluene-soluble portion of the present composition has formed a methylene chloride-insoluble precipitate by allowing the solution to stand for a long period of time, the polymer obtained by sufficiently washing and drying the precipitate contains an inseparable styrene type compound. Thus, the fact that the composition of the present invention contains no oligophenylene ether homopolymer can easily be recognized by anyone skilled in the art according to the known method.

The fact that the compositions of the present invention have excellent such physical properties such as moldability and melt-flow property which are well-balanced with the physical properties of articles molded therefrom as is illustrated below in examples, in which all parts and percentages are by weight unless otherwise indicated.

EXAMPLE 1

A mixture comprising 1.0 kg. of ethylbenzene, 1.5 kg. of oligo(2,6-dimethylphenylene-1,4-ether) having a number average polymerization degree of 73, 2.0 kg. of styrene and 30 g. of di-tert-butyl peroxide was fed to a 10 liter-autoclave, and then stirred at 60°C. to form a homogeneous solution. After purging oxygen inside the reactor by injection of nitrogen gas, the solution was polymerized for 2.5 hours while controlling the inner temperature of the reactor to 135° to 140°C. Thereafter, the contents of the reactor were taken out, and then dried at 215°C. for 2 hours by use of a vacuum drier to remove ethyl benzene and unreacted styrene, whereby a graft copolymer was obtained. From the infrared absorption spectrum of the copolymer, it was calculated that the copolymer had a polystyrene content of 40% and a styrene graft ratio of 67%.

80 Parts of this graft copolymer, 10 parts of polystyrene ("Stylon 683", produced by Asahi-Dow Ltd.) and 10 parts of an emulsion-polymerized styrene-grafted polybutadiene containing 50% of polybutadiene were mixed by means of a mixer and then fusion blended by means of an extruder to obtain a resin composition. The thus obtained resin composition could be injection molded at 240°C. under 550 kg/cm² to give an article having a tensile strength of 600 kg/cm² (as measured according to ASTM D 638; the same shall apply hereinafter), an Izod impact strength of 16.8 kg.cm/cm (as measured according to ASTM D 256; the same shall apply hereinafter) and a heat distortion temperature of 116°C. (as measured according to ASTM D 648; the same shall apply hereinafter).

5.0 Grams of the above-mentioned resin composition was dissolved in 100 ml. of benzene, and the resulting solution was centrifuged at 10,000 r.p.m. for 1 hour to remove insolubles. The supernatant was charged into 500 ml. of methanol to form a re-precipitate, which was then recovered by filtration, washed and dried to obtain a polymer. A solution of 2.0 g. of this polymer in 40 ml. of methylene chloride formed no precipitate at all even after standing for 24 hours.

EXAMPLE 2

A graft copolymer having a styrene graft ratio of 22% was obtained by repeating the polymerization of Example 1, except that the oligophenylene ether was replaced by oligo(2,6-dimethylphenylene-1,4-ether) having a number average polymerization degree of 88. 2.0 Grams of the graft copolymer was dissolved in 40 ml. of methylene chloride, and the resulting solution was allowed to stand. The solution formed no precipitate during 3 hours' standing but formed 0.07 g. of a precipitate after 6 hours' standing. The precipitate was composed of 12% of polystyrene and 88% of oligophenylene ether.

50 Parts of the above-mentioned graft copolymer and 50 parts of rubber-reinforced polystyrene containing 6.7% of polybutadiene were mixed by means of a mixer and then fusion blended by means of an extruder to obtain a resin composition. The thus obtained resin composition could be injection molded at 240°C. under 530 kg/cm² to give an article having a tensile strength of 580 kg/cm², an Izod impact strength of 9.7 kg.cm/cm and a heat distortion temperature of 106°C.

EXAMPLE 3

70 Parts of the graft copolymer obtained in Example 2 and 30 parts of polystyrene ("Stylon 666" produced by Asahi-Dow Ltd.) were mixed by means of a mixer and then pelleted by fusion blending by means of an extruder. The thus obtained resin composition could be injection molded at 240°C. under 530 kg/cm² to give an article having a tensile strength of 690 kg/cm², an Izod impact strength of 4.1 kg.cm/cm and a heat distortion temperature of 123°C.

CONTROL EXAMPLE 1

50 Parts of oligo(2,6-dimethylphenylene-1,4-ether) having a number average polymerization degree of 80 and 50 parts of rubber-reinforced polystyrene ("Stylon XH 902", rubber content 9.6%, produced by Asahi-Dow Ltd.) were mixed by means of a mixer and then fusion blended by means of an extruder to obtain a resin composition. The resin composition was injection molded at 265° under 600 kg/cm² to give an article having a tensile strength of 550 kg/cm², an Izod impact strength of 6.5 kg.cm/cm and a heat distortion temperature of 120°C.

CONTROL EXAMPLE 2

Example 1 was repeated, except that the oligophenylene ether was replaced by oligo(2,6-dimethylphenylene-1,4-ether) and the amount of styrene was varied to 0.3 kg. The resulting copolymer was composed of 89.3% of oligophenylene ether and 10.7% of polystyrene. A solution of 2.0 g. of the copolymer formed 0.90 g. of a precipitate after standing for 3 hours. In this precipitate, only 1% of polystyrene could be detected.

A mixture comprising 56 parts of the above-mentioned graft copolymer, 34 parts of polystyrene and 10 parts of the styrene-grafted polybutadiene used in Example 1 was fusion blended by means of an extruder to obtain a resin composition. The resin composition was injection molded at 265°C. under 600 kg/cm² to give an article having a tensile strength of 430 kg/cm², and an Izod impact strength of 6.8 kg.cm/cm and a heat distortion temperature of 120°C.

Articles molded from the resin compositions of Examples 1 to 3 and Control Examples 1 and 2 were subjected to creep test according to ASTM D 674. The results obtained were as set forth in Table 1.

Table 1

|  | Example | | | Control Example | |
|---|---|---|---|---|---|
|  | 1 | 2 | 3 | 1 | 2 |
| Creep deformation after 1,000 hrs. at 23°C. under load of 210 kg. (%) | 0.94 | 1.08 | 0.88 | 4.25 | 3.82 |
| Creep deformation after 600 hrs. at 60°C. under load of 105 kg. (%) | 0.60 | 0.77 | 0.52 | 2.45 | 2.05 |

From Table 1, it is clear that the degree of creep deformation of articles molded from the resin compositions of Control Examples are great as compared to the creep deformation of articles made using the graft copolymers of the examples according to the present invention.

EXAMPLE 4

A mixture comprising 1.5 kg. of oligo(2,6-dimethylphenylene-1,4-ether) having a number average polymerization degree of 62, 4.0 kg. of styrene and 30 g. of tert-butyl peroxybenzoate was fed to a 10 liter-autoclave, and then stirred at 60°C. to form a homogeneous solution. After purging oxygen inside the reactor by injection of nitrogen gas, the solution was graft polymerized for 3 hours while controlling the inner temperature of the reactor to 140° to 145°C. Thereafter, the content of the reactor was taken out, and then dried at 215°C. for 2 hours by use of a vacuum drier to remove unreacted styrene, whereby a graft copolymer was obtained. The copolymer had a styrene graft ratio of 105% and was composed of 51% of polystyrene and 49% of oligophenylene ether. A solution of 2.0 g. of the copolymer in 40 ml. of methylene chloride formed no precipitate at all even after standing for 24 hours.

70 Parts of the above-mentioned graft copolymer, 10 parts of polystyrene and 20 parts of the styrene-grafted polybutadiene used in Example 1 were mixed by means of a mixer and then fusion blended by means of an extruder to obtain a resin composition. The thus obtained resin composition could be injection molded at 235°C. under 520 kg/cm$^2$ to give an article having a tensile strength of 550 kg/cm$^2$, an Izod impact strength of 21.8 kg.cm/cm and a heat distortion temperature of 101°C.

EXAMPLE 5

A mixture comprising 50 parts of the graft copolymer obtained in Example 4, 22 parts of polystyrene and 28 parts of the styrene-grafted polybutadiene used in Example 1 was melt-kneaded by means of an extruder to obtain a resin composition. The resin composition could be injection molded at 240°C. under 500 kg/cm$^2$ to give an article having a tensile strength of 490 kg/cm$^2$, an Izod impact strength of 36.0 kg.cm/cm and a heat distortion temperature of 92°C.

EXAMPLE 6

Example 4 was repeated, except that the oligophenylene ether was replaced by oligo(2,6-dimethylphenylene-1,4-ether) having a number average polymerization degree of 79 and the polymerization time was varied to 4.5 hours. The resulting graft copolymer had a styrene graft ratio of 180% and was composed of 64% of polystyrene and 36% of oligophenylene ether.

A mixture comprising 75 parts of the above-mentioned graft copolymer, 15 parts of polystyrene and 10 parts of the styrene-grafted polybutadiene used in Example 1 was fusion blended by use of an extruder to obtain a resin composition. The thus obtained resin composition could be injection molded at 240°C. under 500 kg/cm$^2$ to give an article having a tensile strength of 590 kg/cm$^2$, an Izod impact strength of 12.0 kg.cm/cm and a heat distortion temperature of 102°C.

EXAMPLE 7

A homogeneous mixture comprising 88 parts of styrene, 2 parts of mineral oil and 10 parts of ethylbenzene was subjected to continuous bulk polymerization in a first reactor under stirring at 30 r.p.m. The polymerization was proceeded while controlling the temperature and the time so that the conversion at the outlet of the first reactor became 25%. The mixture, which had left the first reactor, was thoroughly mixed by means of an inline mixer with a mixture comprising 80 parts of oligo(2,6-dimethylphenylene-1,4-ether) having a number average polymerization degree of 79 and 20 parts of ethylbenzene which mixture had been melt-extruded from an extruder, and the resulting mixture was fed to a second reactor. In this case, the flow rate of the mixture at the outlet of the first reactor and the extrusion rate of the mixture from the extruder were so controlled as to become identical with each other. A solution of 2 parts of dicumyl peroxide in 12 parts of styrene was fed to the inlet of the second reactor and polymerized at a temperature in the range from 125° to 130°C. The total solid content of the resulting resin composition at the outlet of the second reactor was 64%. The thus obtained polystyrene-containing graft copolymer had an oligophenylene ether content of 58% and a graft ratio of 40%.

A solution of 2.0 g. of the resin composition in 40 ml. of methylene chloride formed no precipitate at all even after standing for 24 hours.

A mixture comprising 37 parts of the above-mentioned graft copolymer-containing resin composition, 53 parts of polystyrene and 10 parts of the styrene-grafted polybutadiene used in Example 1 was fusion blended by use of an extruder to obtain a rubber-reinforced resin. This resin could be injection molded at 240°C. under 520 kg/cm$^2$ to give an article having a tensile strength of 560 kg/cm$^2$, an Izod impact strength of 14.1 kg.cm/cm and a heat distortion temperature of 96°C.

EXAMPLES 8–12

The graft copolymer-containing resin composition obtained in Example 7 was blended with various rubber-reinforced polystyrenes to obtain reinforced resin compositions. The kinds and proportions of the individual resins and the physical properties of articles obtained by molding the resin compositions were as shown in Table 2.

Table 2

| Example | Graft copolymer-containing resin composition (parts) | Polystyrene (parts) | Styrene-grafted polybutediene used in Example 1 (parts) | Rubber-reinforced polystyrene obtained by bulk polymerization (parts) | Tensile strength (kg/cm$^2$) | Izod impact strength (kg.cm/cm) | Heat distortion temperature (°C) |
|---|---|---|---|---|---|---|---|
| 8  | 60 | 32 | 8  | 0  | 610 | 8.6  | 110 |
| 9  | 75 | 12 | 13 | 0  | 630 | 19.0 | 114 |
| 10 | 90 | 0  | 10 | 0  | 710 | 11.8 | 124 |
| 11 | 50 | 20 | 0  | 30 | 540 | 10.5 | 103 |
| 12 | 40 | 20 | 0  | 40 | 485 | 14.5 | 93  |

*"The rubber-reinforced polystyrene obtained by bulk-polymerization" was prepared by the continuous polymerization method using a 10 liter-polymerizer.
The polybutadiene content thereof was 16.0%, and the intrinsic viscosity of the polystyrene portion was 1.05 (as measured in Table 2-continued

| Example | Graft copolymer-containing resin composition (parts) | Poly-styrene (parts) | Styrene-grafted polybutediene used in Example 1 (parts) | Rubber-reinforced polystyrene obtained by bulk polymerization (parts) | Tensile strength (kg/cm²) | Izod impact strength (kg.cm/cm) | Heat distortion temperature (°C) |
|---|---|---|---|---|---|---|---|

0.5% chloroform solution at 25°C.). When molded singly, it gave an article having a tensile strength of 250 kg/cm² and an Izod impact strength of 18.0 kg.cm/cm.

The resin compositions of Examples 8 to 12 were subjected to creep tests at 23° and 60°C. The results obtained were as shown in Table 3.

Table 3

| Example | Creep deformation after 1,000 hours at 23°C. under 210 kg. load (%) | Creep deformation after 600 hours at 60°C. under 105 kg. load (%) |
|---|---|---|
| 8 | 0.88 | 0.50 |
| 9 | 0.96 | 0.61 |
| 10 | 0.89 | 0.55 |
| 11 | 0.95 | 0.81 |
| 12 | 1.24 | 0.85 |

EXAMPLE 13

A mixture comprising 1.5 kg. of ethylbenzene and 2.0 kg. of oligo(2,6-dimethylphenylene-1,4-ether) having a number average polymerization degree of 83 was fed to a 10 liter-autoclave, and heated to 150°C. to form a homogeneous solution. After cooling the solution, 0.5 kg. of styrene and 80 g. of di-tert-butyl peroxide were added to the autoclave, and the resulting mixture was polymerized for 2 hours while controlling the inner temperature of the autoclave to 160°C. Thereafter, the content of the autoclave was taken out, and dried at 215°C. for 2 hours by means of a vacuum drier to obtain a graft copolymer. This copolymer contained 81% of oligophenylene ether.

A mixture comprising 62 parts of the above-mentioned graft copolymer, 28 parts of polystyrene and 10 parts of the styrene-grafted polybutadiene used in Example 1 was fusion blended by means of an extruder to obtain a resin composition. This resin composition could be injection molded at 240°C. under 550 kg/cm² to give an article having a tensile strength of 620 kg/cm², an Izod impact strength of 19.1 kg.cm/cm and a heat distortion temperature of 120°C.

The resin composition was treated with toluene and methanol in the same manner as in Example 1 to obtain a toluene-soluble precipitate. A solution of 2.0 g. of the toluene-soluble precipitate in 40 ml. of methylene chloride formed no precipitate at all even after standing for 24 hours at 30°C.

EXAMPLE 14

A mixture comprising 50 parts of the graft copolymer obtained in Example 13 and 50 parts of the rubber-reinforced polystyrene used in Example 11 was fusion blended by means of an extruder to obtain a resin composition. This resin composition could be injection molded at 240°C. under 530 kg/cm² to give an article having a tensile strength of 550 kg/cm², an Izod impact strength of 12.5 kg.cm/cm and a heat distortion temperature of 110°C.

EXAMPLE 15

A graft copolymer was obtained by repeating the polymerization of Example 13, except that the amount of styrene was varied to 0.4 kg. and the polymerization was conducted at 180°C. for 1 hour. The graft copolymer contained 84.1% of oligophenylene ether. A mixture comprising 80 parts of the graft copolymer, 10 parts of polystyrene and 10 parts of styrene-grafted polybutadiene used in Example 1 was fusion blended by means of an extruder to obtain a resin composition. This resin composition could be injection molded at 250°C. under 550 kg/cm² to give an article having a tensile strength of 710 kg/cm², an Izod impact strength of 16.0 kg.cm/cm and a heat distortion temperature of 136°C.

The resin composition was treated with toluene and methanol in the same manner as in Example 1 to obtain a toluene-soluble precipitate. A solution of 2.0 g. of the toluene-soluble precipitate in 40 ml. of methylene chloride formed no precipitate at all even after standing for 24°C. at 30°C.

CONTROL EXAMPLE 3

A graft copolymer was obtained by repeating the polymerization of Example 2, except that the oligophenylene ether was replaced by oligo(2,6-dimethylphenylene-1,4-ether) having a number average polymerization degree of 48. The graft copolymer had a graft ratio of 22%. A solution of 2.0 g. of this graft copolymer in 40 ml. of methylene chloride formed 0.2 g. of a precipitate after 3 hours' standing and 0.8 g. of a precipitate after 6 hours' standing. The precipitate after 3 hours' standing contained 100% of oligophenylene ether, and the precipitate after 6 hours' standing contained 94% of oligophenylene ether and 11% of polystyrene.

A mixture comprising 50 parts of the above-mentioned graft copolymer and 50 parts of a rubber-reinforced polystyrene containing 6.7% of polybutadiene was fusion blended by means of an extruder to obtain a resin composition. The resin composition was molded at 240°C. under 530 kg/cm² to give an article having a tensile strength of 330 kg/cm², an Izod impact strength of 2.2 kg.cm/cm and a heat distortion temperature of 102°C.

CONTROL EXAMPLE 4

A resin composition was obtained by repeating the procedure of Example 6, except that the oligophenylene ether was replaced by oligo(2,6-dimethylphenylene-1,4-ether) having a number average polymerization degree of 52. This resin composition could be injection molded at 240°C. under 500 kg/cm² to give an article having a tensile strength of 170 kg/cm², an Izod impact strength of 1.4 kg.cm/cm and a heat distortion temperature of 97°C.

Control Examples 3 and 4 show that resin compositions containing graft copolymers prepared from oligophenylene ethers excessively low in number average polymerization degree do not have a desirable balance of physical properties.

CONTROL EXAMPLE 5

A resin composition was obtained by repeating the procedure of Example 4, except that the oligophenylene ether was replaced by poly(2,6-dimethylphenylene-1,4-ether) having a number average polymerization degree of 98. This resin composition was low in flowability and required the conditions of 280°C. and 600 kg/cm² for injection molding to give an article having a tensile strength of 600 kg/cm², an Izod impact strength of 11 kg.cm/cm and a heat distortion temperature of 96°C.

CONTROL EXAMPLE 6

A resin composition was obtained by repeating the procedure of Example 13, except that the oligophenylene ether was replaced by poly(2,6-dimethylphenylene-1,4-ether) having a number average polymerization degree of 110. This resin composition required the conditions of 300°C. and 800 kg/cm² for injection molding to give an article having a tensile strength of 560 kg/cm², an Izod impact strength of 4.3 kg.cm/cm and a heat distortion temperature of 108°C.

The resin composition was treated with toluene and methanol in the same manner as in Example 1 to obtain a toluene-soluble precipitate. A solution of 2.0 g. of the toluene-soluble precipitate in 40 ml. of methylene chloride formed 0.08 g. of a precipitate after 3 hours' standing at 30°C. This precipitate was composed of 96% of polyphenylene ether and 4% of polystyrene.

Control Examples 5 and 6 show that resin compositions containing graft copolymers prepared from oligophenylene ethers excessively high in number average polymerization degree are extremely low in moldability and, due probably to this, are inferior in the balance of physical properties compared to the resin compositions of the present invention which are identical in the kind of constituents employed with the said resin compositions.

EXAMPLE 16

A graft copolymer was prepared by the same procedure as described in Example 1, except that monochlorostyrene was used in place of styrene. The degree of grafting of monochlorostyrene in the resulting copolymer was 31%.

75 Parts of this graft copolymer, 12 parts of polystyrene and 13 parts of the same styrene-grafted polybutadiene as used in Example 1 were mixed in a mixer and then fusion blended by means of an extruder to obtain a blended resinous composition. The thus obtained resin composition could be injection molded at 240°C. under 530 kg/cm² to give an article having a tensile strength of 620 kg/cm², an Izod impact strength of 20.5 kg.cm/cm and a heat distortion temperature of 119°C.

EXAMPLE 17

A graft copolymer was prepared by the same procedure as described in Example 16, except that 0.5 kg of 2,4-dimethyl styrene was used in place of monochlorostyrene. The degree of grafting of 2,4-dimethyl styrene in the resulting copolymer was 30%.

62 Parts of this graft copolymer, 26 parts of polystyrene and 12 parts of styrene-grafted polybutadiene were mixed and fusion blended by means of an extruder to obtain a blended resinous composition. The resinous composition could be injection molded at 240°C. under 550 kg/cm² to give an article having a tensile strength of 600 kg/cm², an Izod impact strength of 22.0 kg.cm/cm and a heat distortion temperature of 125°C. When the resinous composition was treated with toluene-methanol similarly as in Example 1 and a solution of 2.0 g. of the toluene-soluble portion in 40 ml. of methylene chloride was left to stand at 30°C, no precipitate was formed at all even after standing for 24 hours.

CONTROL EXAMPLE 7

40 Parts of polyphenylene ether (General Electric Co.; trade name: PPO-531-801), 40 parts of polystyrene and 20 parts of a styrene-butadiene-styrene block copolymer were mixed and fusion blended by passing twice through an extruder. The thus prepared resinous composition could be injection molded at 325°C and 950 kg/cm² to give a test strip having a tensile strength of 430 kg/cm², an Izod impact strength of 25.5 kg.cm/cm and a heat distortion temperature of 106°C.

Thus, the present invention provides a novel resin composition comprising a styrene type compound polymer and a graft copolymer prepared by graft polymerizing a styrene type compound on an oligophenylene ether chain which contains substantially no oligophenylene ether homopolymer. Since the resin composition of the present invnetion contains no oligophenylene ether homopolymer, the moldability of the resin composition is well balanced with the physical properties of an article molded therefrom, and the article is far superior particularly in creep resistance than an article molded from a resin composition containing oligophenylene ether homopolymer.

What we claim is:

1. A graft copolymer composition which comprises 30 to 90 wt. % of a graft copolymer, 10 to 70 wt. % of a styrene type compound polymer having a number average molecular weight in the range from 50,000 to 200,000 and selected from the group consisting of styrene, lower alkyl styrenes and halostyrenes, said graft copolymer containing substantially no polyphenylene ether homopolymer and having been prepared by graft polymerizing with stirring under anhydrous conditions at a temperature of 130° to 200°C. 20 to 200 parts by weight of a styrene type compound selected from the group consisting of styrene, lower-alkyl styrenes and halostyrenes on 100 parts of an oligophenylene ether having the formula

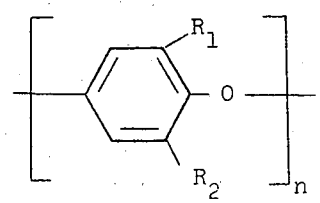

wherein $R_1$ and $R_2$ are alkyl of 1 to 4 carbon atoms or a halogen atom and n represents a polymerization degree ranging from 60 to 90, in the presence of 0.1 to 15 parts by weight of a radical initiator based on the polyphenylene ether, said composition having excellent resistance to creep.

2. A composition according to claim 1 wherein the composition consists essentially of said graft copolymer and said styrene type compound polymer.

3. A composition according to claim 1 wherein the composition includes 2 to 15 wt. % of a synthetic rubber.

4. A composition according to claim 1 wherein the styrene type compound polymer is polystyrene.

5. A composition according to claim 1 wherein the styrene is used in an amount of 25 to 170 parts per 100 parts of polyphenylene ether.

6. A composition according to claim 5 wherein $R_1$ and $R_2$ are both methyl.

7. A composition according to claim 1 wherein the polyphenylene ether used for preparation of the graft copolymer has a number average polymerization degree between 65 and 85.

8. A composition according to claim 1 wherein the graft copolymer is prepared in the absence of a solvent.

9. A composition according to claim 1 wherein the graft copolymer is prepared in the presence of an organic solvent inert under the reaction conditions.

10. A composition according to claim 9 wherein the solvent is a hydrocarbon.

11. A composition according to claim 9 wherein the solvent is an aromatic hydrocarbon or a halogenated aromatic hydrocarbon.

12. A composition according to claim 11 wherein the solvent is alkyl benzene.

13. A composition according to claim 1 containing 0 to 15% of a conjugated diene rubber.

14. A composition according to claim 13 containing 2 to 15% of said rubber.

15. A composition according to claim 14 wherein the rubber is polybutadiene, polyisoprene or butadiene-styrene copolymer.

* * * * *